United States Patent [19]

Kondoh et al.

[11] Patent Number: 5,241,148
[45] Date of Patent: Aug. 31, 1993

[54] APPARATUS FOR MEASURING HEATING TEMPERATURE IN HIGH ELECTRIC FIELD OF MICROWAVES

[75] Inventors: Isao Kondoh; Toru Suzuki; Yoshiyuki Kato, all of Ibaraki, Japan

[73] Assignee: Doryokuro Kakunenryo Kaihatsu Jigyodan, Tokyo, Japan

[21] Appl. No.: 810,886

[22] Filed: Dec. 20, 1991

[30] Foreign Application Priority Data

Jan. 10, 1991 [JP] Japan ................... 3-001298

[51] Int. Cl.⁵ .............................................. H05B 6/68
[52] U.S. Cl. ...................... 219/10.55 B; 374/149
[58] Field of Search .......... 219/10.55 B, 10.55 E, 219/10.55 R; 374/121-123, 130-132, 149, 125

[56] References Cited

U.S. PATENT DOCUMENTS

| | | | |
|---|---|---|---|
| 4,286,134 | 8/1981 | Nakata et al. | 219/10.55 B |
| 4,367,388 | 1/1983 | Ishihara et al. | 219/10.55 B |
| 4,626,110 | 12/1986 | Wickersheim et al. | 374/131 |
| 4,785,824 | 11/1988 | Wickersheim et al. | 374/131 X |
| 4,794,619 | 12/1988 | Tregay | 374/131 |
| 4,799,787 | 1/1989 | Mason | 374/131 X |
| 4,836,689 | 6/1989 | O'Brien et al. | 374/125 |
| 5,134,263 | 7/1992 | Smith et al. | 219/10.55 B |

*Primary Examiner*—Philip H. Leung
*Attorney, Agent, or Firm*—Wenderoth, Lind & Ponack

[57] ABSTRACT

An apparatus for measuring heating temperature in a high electric field of microwaves comprises a microwave heating chamber, an infrared radiation thermometer disposed outside the microwave heating chamber, a probe formed of a microwave transparent material disposed inside the microwave heating chamber, a fiber cable connecting the probe and the thermometer, and a lens for focusing infrared rays generated from a substance to be heated in the microwave heating chamber and transmitting the focused infrared rays into the fiber cable. By this construction, the focused infrared rays are transmitted outside the microwave heating chamber through the fiber cable so as to measure an infrared radiation temperature by the thermometer. When a purge gas releasing function is added to the probe, the detection of infrared rays can be performed with water vapor and a decomposition gas removed by a purge gas, even when these matters are released from the substance to be heated during microwave heating.

4 Claims, 1 Drawing Sheet

APPARATUS FOR MEASURING HEATING TEMPERATURE IN HIGH ELECTRIC FIELD OF MICROWAVES

BACKGROUND OF THE INVENTION

The present invention relates to an apparatus for measuring the temperature of a substance to be heated in a high electric field of microwaves.

When it is desired to know the temperature of a substance heated in a microwave heater, a probe such as a thermocouple may be inserted into an electronic range without any impediment if the electronic range is a household one having an electric field strength of an oscillation output of about 600 W to 1 KW. However, in the case of an industrial microwave heater having a high electric field strength of an oscillation output above 1 KW, employment of the probe brings about such disadvantages that abnormal heating occurs in the probe and that disconnection or the like is caused by a discharge of a probe cable element or others, and thus satisfactory measurement can not be carried out.

Even when a non-contact type thermometer such as an infrared radiation thermometer is employed to measure a temperature from outside of the heater so as to avoid the effect of the high electric field of the microwaves, accurate measurement of the temperature can not be performed as the inside of the heater is filled with water vapor, a decomposition gas, etc. generated from the substance to be heated.

To cope with these disadvantages, measurement has been conducted heretofore by inserting a thermocouple into the heater after microwave heating has been stopped.

Much inconvenience and many problems are caused by the above-described conventional temperature measurement wherein the microwave heating is stopped for each temperature measurement in an environment of high temperature or high radiation.

SUMMARY OF THE INVENTION

It is therefore an object of the present invention to overcome the prior art inconvenience and problems described above and to provide an apparatus for measuring heating temperature in a high electric field of microwaves by which it is not required to stop the microwave heating for each temperature measurement.

An apparatus for measuring heating temperature in a high electric field of microwaves according to the present invention comprises a microwave heater, an infrared radiation thermometer disposed outside the microwave heater, a probe formed of a microwave transmitting material disposed inside the microwave heater, a fiber cable connecting the probe and the thermometer, and a lens means for collecting infrared rays generated from a substance to be heated in the microwave heater and transmitting the collected infrared rays into the fiber cable. By the apparatus having the construction as described above, the collected infrared rays are transmitted outside the microwave heater through the fiber cable so as to measure an infrared radiation temperature by the thermometer.

In a preferred embodiment of the present invention, the apparatus further includes a purge gas channel formed in the probe, a purge gas supply source disposed outside the microwave heater, and a gas purge pipe connecting the channel formed in the prove and the purge gas supply source. By the construction described above, the infrared rays are collected by the lens means, while water vapor and/or a decomposition gas generated from the substance to be heated is removed by the purge gas.

BRIEF DESCRIPTION OF THE DRAWINGS

The present invention will be described hereinbelow by referring to the accompanying drawings of which

PREFERRED EMBODIMENTS OF THE INVENTION

Figure 1:
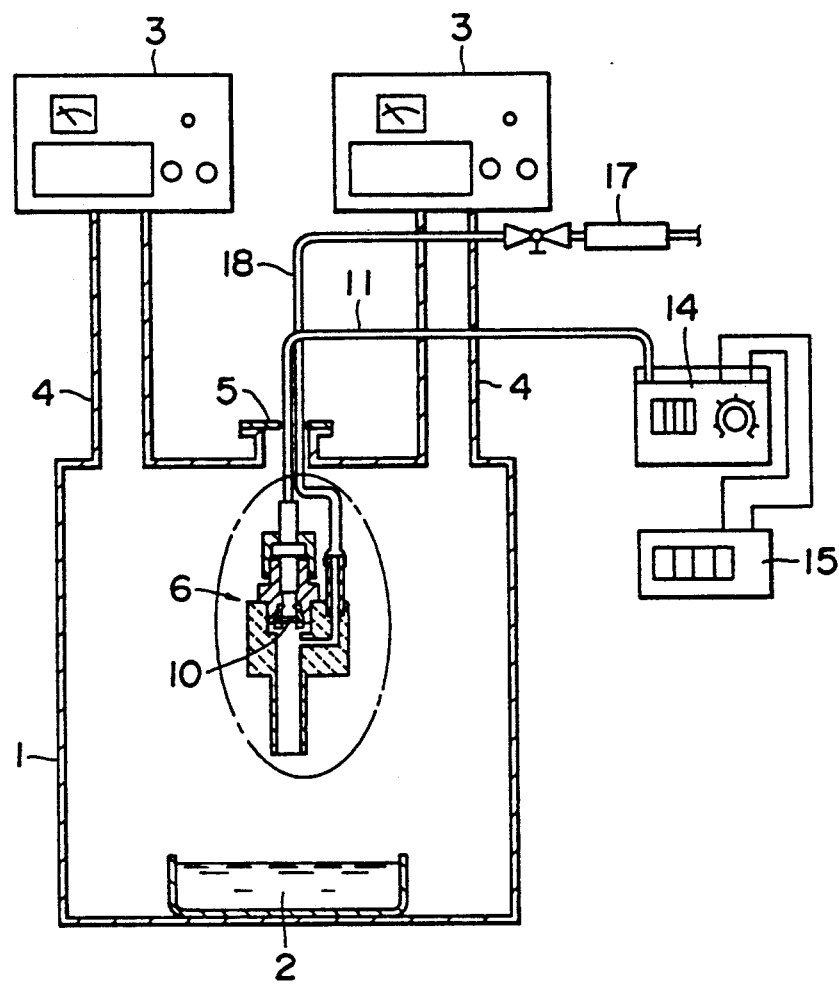
FIG. 1 illustrates an embodiment of the apparatus for measuring heating temperature according to the present invention.

In FIG. 1, a microwave heater (or chamber) 1 having microwave oscillators (or generators) 3, 3 provided with waveguides 4, 4 enables microwave heating of a substance 2 to be heated which is held in the heating chamber 1. A monitoring window 5 is formed on the upper side of the heating chamber 1.

Inside this heater 1, a probe 6 made of a microwave transparent material such as Teflon, quartz, silicon nitride or alumina is set in the vicinity of the substance 2 to be heated. As seen best in FIG. 2, this probe is constructed of a probe main body 9 having a tubular part 7 formed in the lower part thereof and a fitting hole 8 so bored as to be aligned with the tubular part 7 and to communicate with the tubular part 7, a fixing piece 12 for fitting a lens 10 which collects infrared rays emitted from the heated substance 2 and a fiber cable 11 which transmits the collected rays outside the heating chamber 1, and a nut 13 fitted to the upper end of the fixing piece 12. A coupled body of the fixing piece 12 and the nut 13 is fitted in the fitting hole 8 of the probe main body 9.

The fiber cable 11 located in the heating chamber 1 extends outside through the monitoring window 5 of the heating chamber 1 and is connected to a main body 14 of an infrared radiation thermometer at the terminal thereof. A temperature measured by the main body 14 of the radiation thermometer is displayed on a temperature display device 15.

Figure 2:
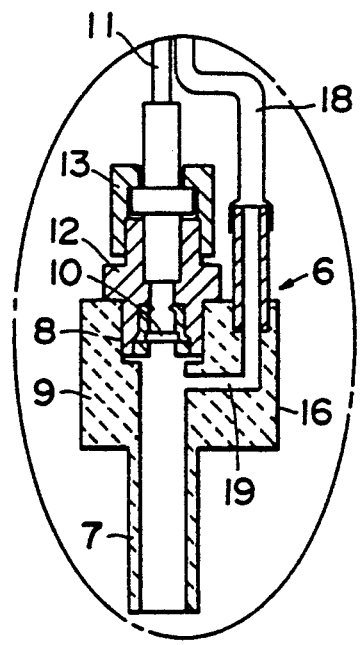
FIG. 2 is an enlarged view of a portion of FIG. 1.

In the probe 6 shown in FIG. 2, a gas purge hood 16 is formed in the lateral part of the probe main body 9. In the gas purge hood 16 is bored a purge gas channel 19 for enabling release of a purge gas into the above-described tubular part 7. The channel 19 bored in the hood 16 is connected to a flow regulator 17 and a purge gas supply source (not shown in FIG. 1) disposed outside the heating chamber 1 via a gas purge pipe (or conduit) 18 which extends outside through the monitoring window 5 formed on the upper side of the heating chamber 1. The purge gas is released toward the surface of the heated substance 2 from the tubular part 7 of the probe 6. Even when water vapor, a decomposition gas, etc. are released from the substance 2, accordingly, the measurement of the infrared radiation temperature can be effectively performed while the released matters are removed by the purge gas from the space between the probe 6 and the substance 2 to be heated.

In the apparatus according to the present invention, by forming the measuring probe of the non-contact type radiation thermometer out of the microwave transparent material, no abnormal heating occurs even when the probe is left in the high electric field of microwaves. Therefore, the probe can be employed without any impediment even in an environment of high temperature and high radiation by selecting an appropriate microwave transparent material therefor. Besides, the probe can be set fin the vicinity of the substance to be heated and, therefore, it is effective to make accurate temperature measurements. In addition, since the probe has a very simple structure constructed of small components, maintenance thereof is facilitated.

In one embodiment of the present invention, since the probe is so designed that purge gas can be blown toward the surface of the heated substance, the lens for collecting infrared rays can be protected and also infrared-ray measurement can be conducted with the water vapor and the decomposition gas removed and purged, even when they are released by heating of the substance to be heated. Thus, more precise measurement of the infrared radiation temperature is possible.

While the present invention has been described with respect to preferred embodiments, it should be apparent to those skilled in the art that numerous modifications may be made thereto without departing from the scope of the invention.

We claim:

1. A microwave heating apparatus comprising:
    a heating chamber for supporting an object to be heated;
    a microwave generator for generating microwave energy inside said heating chamber to heat the object;
    an infrared radiation thermometer disposed outside said heating chamber;
    a probe disposed inside said heating chamber, said probe being formed of a microwave transparent material;
    a fiber cable having a first end connected to said probe and a second end connected to said thermometer; and
    a lens means fixed in said probe in alignment with said fiber cable for collecting infrared rays radiated from the object to be heated in said heating chamber and transmitting the collected infrared rays into said fiber cable;
    whereby the collected infrared rays are transmitted through said fiber cable to said thermometer disposed outside said heating chamber so as to measure an infrared radiation temperature of the object.

2. A microwave heating apparatus as recited in claim 1, wherein
    said heating chamber includes a supporting surface for supporting the object to be heated; and
    said leans means is interposed between said first end of said fiber cable and said supporting surface of said heating chamber.

3. A microwave heating apparatus as recited in claim 1, further comprising:
    a purge gas supply source disposed outside said heating chamber;
    a gas purge conduit connecting said purge gas supply source to said probe; and
    wherein a purge gas channel is formed in said probe and operably connected with said gas purge conduit for releasing the purge gas from said supply source toward the object;
    whereby the infrared rays are collected by said lens means, while water vapor and/or a decomposition gas generated from the object is removed by purge gas from said purge gas supply source.

4. A microwave heating apparatus as recited in claim 3, wherein
    said heating chamber includes a supporting surface for supporting the object to be heated; and
    said leans means is interposed between said first end of said fiber cable and said supporting surface of said heating chamber.

* * * * *